United States Patent [19]
Ohno

[11] Patent Number: 5,603,889
[45] Date of Patent: Feb. 18, 1997

[54] METHOD FOR FORMING PATTERN ONTO ARTICLE DURING INJECTION MOLDING THEREOF

[75] Inventor: Shinpei Ohno, Tokyo, Japan

[73] Assignee: Dai Nippon Printing Co., Ltd., Japan

[21] Appl. No.: 369,491

[22] Filed: Jan. 6, 1995

Related U.S. Application Data

[62] Division of Ser. No. 51,365, Apr. 23, 1993, Pat. No. 5,415,536.

[30] Foreign Application Priority Data

Apr. 28, 1992 [JP] Japan .................................. 4-108271

[51] Int. Cl.$^6$ ........................ B29C 33/02; B29C 33/12; B29C 45/14
[52] U.S. Cl. ........................ 264/510; 264/513; 264/548; 425/112
[58] Field of Search ........................ 425/112, 121, 425/126.1, 129.1; 264/511, 259, 266, 275, 294, 510, 553, 513, 548

[56] References Cited

U.S. PATENT DOCUMENTS

| | | | |
|---|---|---|---|
| 3,737,496 | 6/1973 | Voorhees, Sr. ........................ | 425/112 |
| 4,360,329 | 11/1982 | Hatakeyama ........................ | 425/112 |
| 4,439,123 | 3/1984 | Sano ........................ | 425/112 |
| 4,545,752 | 10/1985 | Hanamoto et al. ........................ | 264/511 |
| 4,639,341 | 1/1987 | Hanamoto et al. ........................ | 264/511 |
| 4,676,938 | 6/1987 | Karklin et al. ........................ | 425/126.1 |
| 4,710,338 | 12/1987 | Bagnall et al. ........................ | 425/126.1 |
| 4,865,793 | 9/1989 | Suzuki et al. ........................ | 264/278 |
| 4,994,224 | 2/1991 | Itoh et al. ........................ | 425/126.1 |
| 5,123,823 | 6/1992 | Banjo et al. ........................ | 425/121 |
| 5,401,457 | 3/1995 | Valyi ........................ | 264/266 |

*Primary Examiner*—Angela Ortiz
*Attorney, Agent, or Firm*—Parkhurst, Wendel & Burr, L.L.P.

[57] ABSTRACT

A method for forming a pattern onto an article during injection molding thereof. A pattern-bearing film is heated and softened by a heating board. The softened pattern-bearing film is transferred to the cavity surface of a female mold. Thereafter, the female mold and a male mold are closed. Then, a molten resin is injected into the cavity. When a pattern-bearing film is brought in contact with and heated by the heating board, marks or impressions of air blow holes on the surface of the heating board remain on the pattern-bearing film. To prevent the formation of these marks or impressions, a square-shaped holding frame is fixed on the surface of the heating board. The peripheral portion of the pattern-bearing film is held on the surface of the holding frame. Thus, while the pattern portion of the pattern-bearing film is spaced apart from the surface of the heating board, the film is heated. To keep the pattern-bearing film uniformly spaced from the surface of the heating board, air is supplied to the inside of the holding frame.

12 Claims, 16 Drawing Sheets

METHOD FOR FORMING PATTERN ONTO ARTICLE DURING INJECTION MOLDING THEREOF

This is a division of application Ser. No. 08/051,365 filed Apr. 23, 1993, now U.S. Pat. No. 5,415,536.

BACKGROUND OF THE INVENTION

1. Field of the Invention

The present invention relates to a method for forming a pattern onto an article during an injection molding thereof and an apparatus for the same, for preventing impressions of a heating board from remaining on the surface of the molded article or molding.

2. Description of the Related Art

Conventionally, as decorative patterning methods for three-dimensional solid moldings, a laminate method and a transfer printing method are known. In the laminate method, after a film on which a pattern has been printed is shaped or concurrently therewith, the film is adhered to a substrate, or while or after the film is shaped, the film is filled with a resin. On the other hand, in the transfer printing method, only a pattern ink of a film on which the pattern has been printed is transferred to a molded article or molding.

As a transfer printing method, a method disclosed in Japanese Patent Laid-Open Publication Serial No. SHO 62-196113, published on Aug. 29, 1987 is known. In this method, as will be described later, a heating board which absorbs a pattern-bearing film thereon is moved into a space between a male mold and a female mold which are spaced apart from each other by a predetermined distance. Then the pattern-bearing film heated by the heating board is vacuum absorbed to the inner surface of the female mold. Thereafter, the heating board is retreated to the outside of the space between the male mold and the female mold. Next, the male mold and the female mold are clamped or closed. In the cavity defined by these molds, a molten resin is injected to form a molded article. Thus, the pattern-bearing film is attached to the surface of the molded resin article.

However, in this method, when the pattern-bearing film is absorbed to the heating board, air is caught between the heating board and the pattern-bearing film. This air remains as air bubbles. Thus, the pattern-bearing film is not uniformly heated. In addition, marks or impressions of vacuum holes defined on the heating board remain on the surface of the final molding having the pattern-bearing film absorbed thereby. Thus, the appearance of the molding is adversely affected.

To solve this problem, a method as disclosed in Japanese Patent Laid-Open Publication Serial No. HEI 3-96320 has been proposed. In this method, a pattern-bearing film absorbing surface of a heating board is formed of an uneven surface having a large number of concave and convex portions. With these concave and convex portions, a large number of passageways are formed so as to allow the air to escape. In this method, although air bubbles may be prevented, if the pattern-bearing film is thin, the impressions of the concave and convex portions and the vacuum holes remain on the pattern-bearing film. Thus, the appearance of the molding is deteriorated.

SUMMARY OF THE INVENTION

The present invention is made from the above-mentioned point of view. An object of the present invention is to provide a method for forming a pattern onto an article during an injection molding thereof and an apparatus for the same for preventing the impressions from remaining on the surface of a molding with a pattern.

According to one aspect of the present invention, the above object is accomplished by a method for forming a pattern onto an article during an injection molding thereof, comprising the steps of moving a pattern-bearing film to a molding position where a male mold and a female mold are opposed, heating the pattern-bearing film by a heating board so as to soften it, transferring the pattern-bearing film to an internal surface of the female mold so as to contact the pattern-bearing film with the internal surface, retracting the heating board from the molding position, clamping the male mold and the female mold, injecting a molten resin into a cavity defined by the male mold and the female mold so as to form a molded article, and adhering the pattern-bearing film to the surface of the molding, wherein the improvement comprises the step of holding only an outer peripheral portion of the pattern-bearing film in a spaced relation to a heating surface of the heating board so as to prevent the pattern-bearing film from directly contacting the heating surface.

According to another aspect of the present invention, the above object is accomplished by an apparatus for forming a pattern onto an article during an injection molding thereof, comprising means for feeding a pattern-bearing film to a molding position where a male mold and a female mold are opposed, heating board means for heating the pattern-bearing film so as to soften it, the heating board having a heating surface and being movable into and away from a space between the male mold and the female mold, means for transferring the pattern-bearing film to an internal surface of the female mold so as to contact the pattern-bearing film with the internal surface, means for causing the male mold and the female mold with the pattern-bearing film therein to approach each other so as to form a closed molding cavity, and resin injecting means for injecting a molten resin into the cavity so as to form a molded article and for adhering the pattern-bearing film to the surface of the article, the improvement comprising holding frame means fixed on the heating surface of the heating board and raised from the heating surface, for holding only an outer peripheral portion of the pattern-bearing film over the heating surface so as to prevent the pattern-bearing film from directly contacting the heating surface. According to the present invention, after the pattern-bearing film is heated by the heating board, marks or impressions of the air blowing holes of the heating board do not remain on the pattern-bearing film since the pattern-bearing film is apart from the surface of the heating board.

These and other objects, features and advantages of the present invention will become more apparent in light of the following detailed description of best mode embodiments thereof, as illustrated in the accompanying drawings.

DESCRIPTION OF THE PREFERRED EMBODIMENTS

In order to make clear novel features of the embodiments of the present invention and to make clear attendant problems of the prior art, an apparatus for forming a pattern onto an article during an injection molding thereof, described in Japanese Patent Laid-Open Publication Serial No. SHO 62-196113, will be explained with reference to FIGS. 18 through 22.

Figure 18:
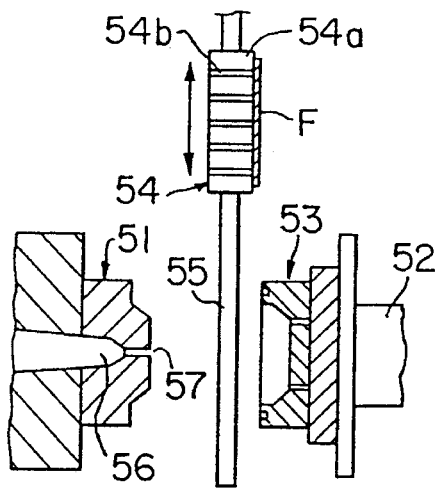
FIGS. 18 through 22 are sectional views showing successive operational steps of a known apparatus.

As shown in FIG. 18, a male mold 51 and a female mold 53 are oppositely disposed. The male mold 51 is stationary, while the female mold 53 is movable by a ram 52 in the left and right directions toward and away from the male mold 51. A heating board 54 is movable over a rail 55 into and away from the space between the molds 51 and 53.

At the center of the male mold 51, an injection unit 56 is disposed. The injection unit 56 injects a pressured molten resin. The pressured molten resin is supplied to a cavity of the female mold 53 through an injection gate 57 disposed in the male mold 51.

The operation of the above-described apparatus is as follows.

Figure 19:
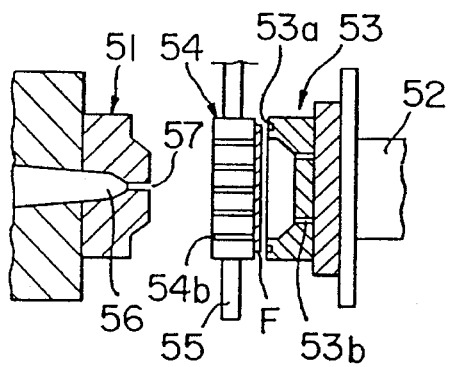
Figure 20:
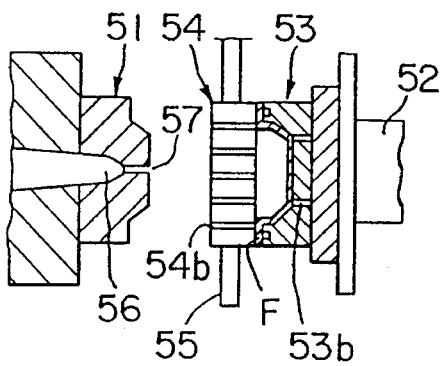
Figure 21:
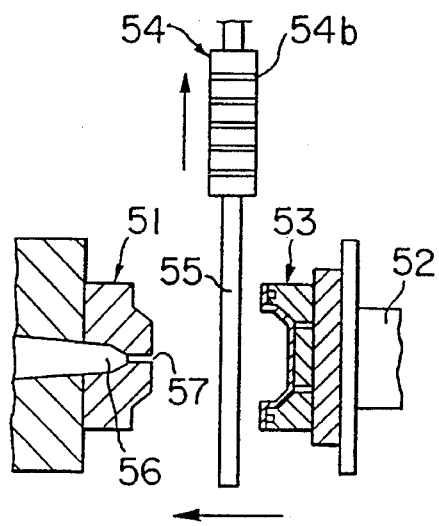
Figure 22:
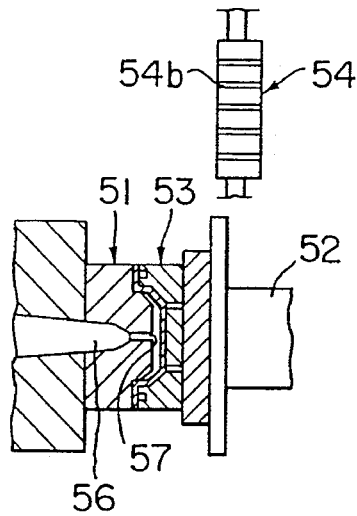

As shown in FIG. 18, a strip-shaped pattern-bearing film F is fed to a heating surface 54*a* of the heating board 54 by a feed unit (not shown in the figure). Thereafter, the pattern-bearing film F is cut into a piece with a size corresponding to one molded article. The resultant piece of film F is sucked through vacuum holes 54*b* defined in the heating board 54. Thus, the film F is brought into close contact with the heating surface 54*a*. Thereafter, as shown in FIG. 19, the heating board 54, while transferring heat to the pattern-bearing film F, is moved downwardly as viewed until it comes to an opposite position of the female mold 53. Next, the ram 52 is advanced rightwardly whereby an end surface 53*a* of the female mold 53 and the heating board 54 clamp the pattern-bearing film F therebetween. Then, as shown in FIG. 20, the pattern-bearing film F is sucked by vacuum holes 53*b* formed in the female mold 53. Thus, the pattern-bearing film F is absorbed and brought in close contact with an internal molding surface of the female mold 53. Thereafter, as shown in FIG. 21, the heating board 54 is moved over the rail 55 away from the molds. As a result, the male mold 51 and the female mold 53 are opposed. In this state, the ram 52 is further advanced rightwardly. Thus, as shown in FIG. 22, the male mold 51 and the female mold 53 are brought into mutual abutment. In this state, a molten resin is supplied from the injection unit 56 into the cavity through the injection gate 57. Thus, a molding or molded article is formed.

However, in the above method, when the pattern-bearing film F is contacted with the heating board 54, if "air bubbles" are caught, the pattern-bearing film F will not be uniformly heated. In addition, the vacuum holes 54*b* on the heating board 54 will be impressed to the film F and deteriorate the appearance thereof.

To solve such problems, Japanese Patent Laid-Open Publication Serial No. HEI 3-96320 proposes forming an uneven surface on the heating board so as to communicate each vacuum hole 54*b* with passageways formed in the uneven surface.

However, even when such uneven surface is provided, uneven marks or impressions still remain on the molded article depending on the thickness of the pattern-bearing film. Thus, the appearance of the molded article becomes poor.

According to the present invention, such problems can be solved. Embodiments of the present invention will now be described with reference to the drawings.

Figure 1:
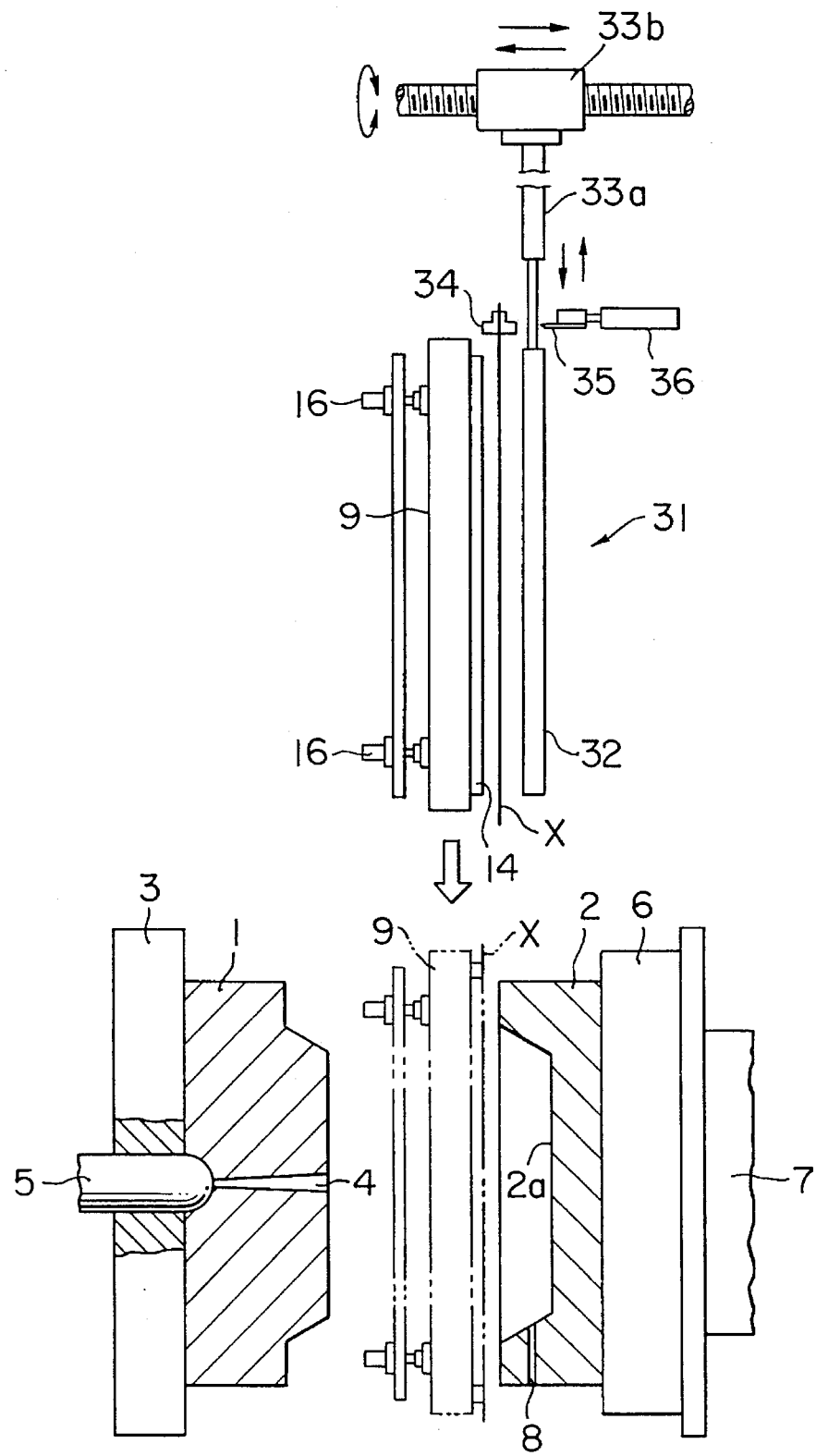
FIG. 1 is a side view schematically showing the overall construction of an embodiment according to the present invention.

FIG. 1 is a side view schematically showing the overall construction of an apparatus for forming a pattern onto an article during an injection molding thereof. A male mold 1 is fixed on a mounting board 3. The male mold 1 is opposed to a female mold 2. An injection nozzle 5 is disposed on the male mold 1 to communicate with an injection gate 4. The female mold 2 is fixed to a ram 7 through a movable board 6. With forward and backward traveling operation of the ram 7, the female mold 2 advances to and retreats from the male mold 1. In addition, the female mold 2 is provided with an air exhaust hole 8 through which air in the female mold 2 is exhausted to the outside by a vacuum pump (not shown in the figure).

At a position spaced apart from the outer peripheries of the male mold 1 and the female mold 2 by a predetermined distance, a heating board 9 is disposed. The position where the heating board 9 is disposed will hereinafter be referred to as the standby position. On the other hand, the position where the male mold 1 and the female mold 2 are opposed and the heating board 9 is moved therebetween will hereinafter be referred to as the loading position. The heating board 9 can be laterally travelled between the standby position and the loading position by a drive means. The drive means comprises a feed screw 33*c* and a motion conversion member 33*b* in the form of a nut. The motion conversion member has female threads which are engaged with the male threads of the feed screw 33*c* so as to convert the rotation of the feed screw into linear motion along the feed screw 33*c*. In the figure, the standby position is denoted by the solid line, while the loading position is denoted by the two-dashed line. At the standby position, the heating board 9 absorbs a pattern-bearing film X and travels to the loading position so as to place the film X between the male mold 1 and the female mold 2. While the heating board 9 is travelling from the standby position to the loading position, it heats the absorbed pattern-bearing film X so as to properly soften it. Thereafter, the pattern-bearing film X is released at the loading position and absorbed to an internal cavity surface 2*a* of the female mold 2. In order to carry out this operation, the heating board 9 has means for holding the pattern-bearing film X on the side facing the female mold 2.

Figure 2:
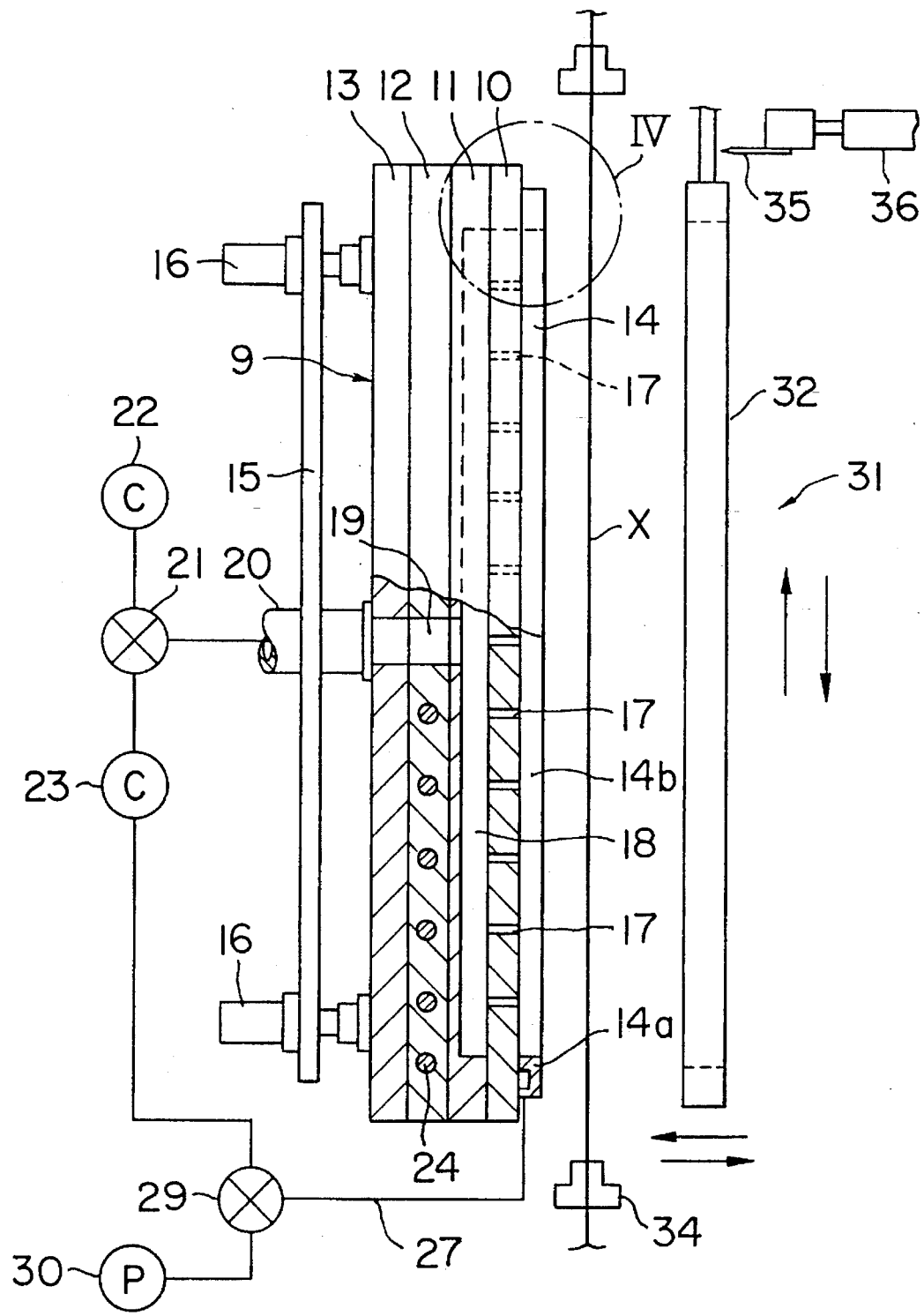
FIG. 2 is a partial sectional side view of a heating board according to the embodiment.
Figure 3:
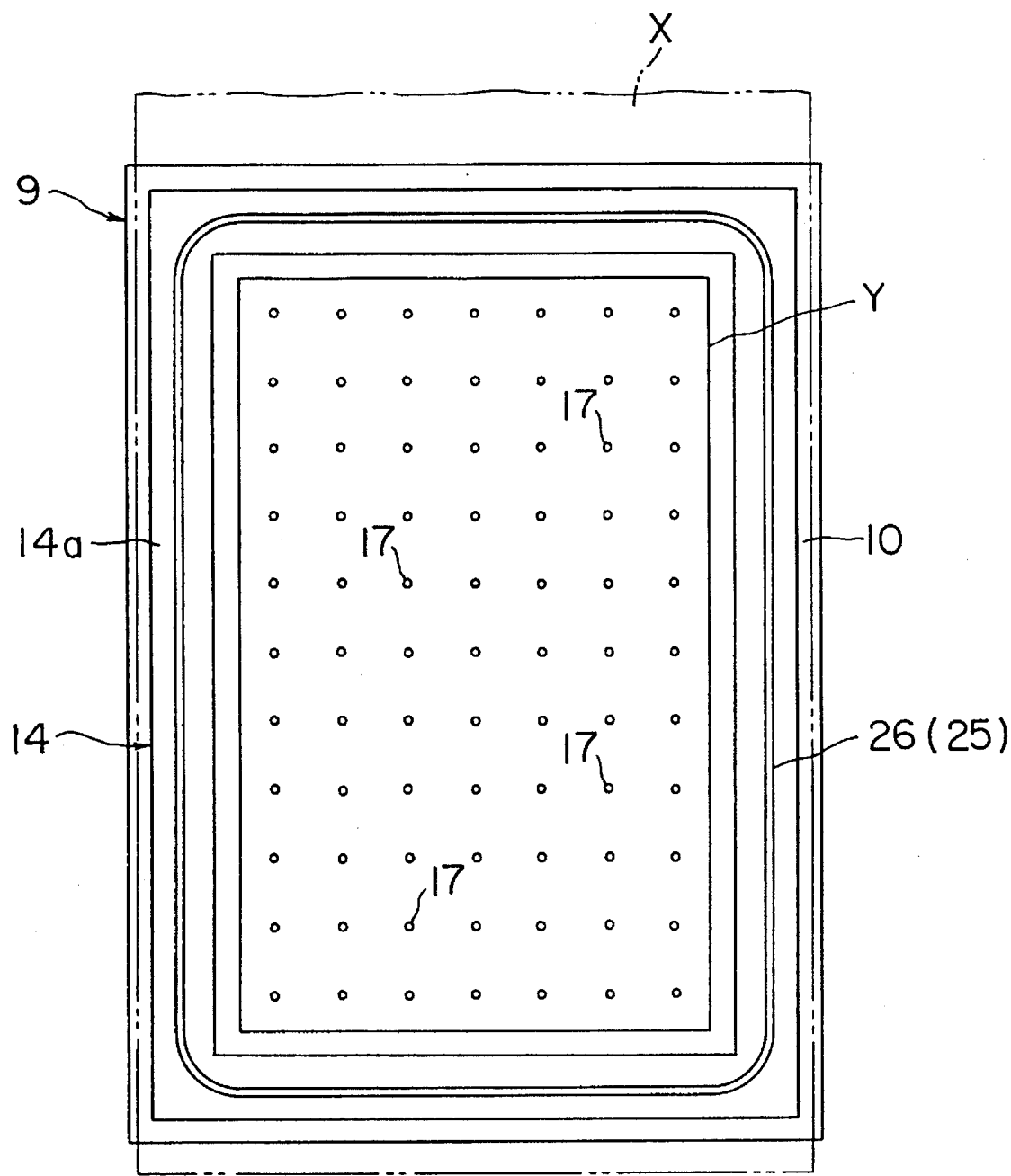
FIG. 3 is a front view of the heating board.

FIGS. 2 and 3 show the construction of the heating board 9 in detail.

The heating board 9 has integral layers of a heating plate 10, a liner plate 11, a heater panel 12, and an insulation plate 13 which are disposed in this order. To the heating plate 10 is absorbed the pattern-bearing film X. On the front surface of the heating plate 10, a square-shaped holding frame 14 is provided which is one of essential elements of the present invention. The heating board 9 is mounted to a support member 15 so as to be moved by solenoids 16. With the operation of the solenoids 16, the heating board 9 is moved in the direction perpendicular to the loading direction. The solenoids 16 cause the heating board 9 to advance to and retreat from the female mold 2.

Figure 5:
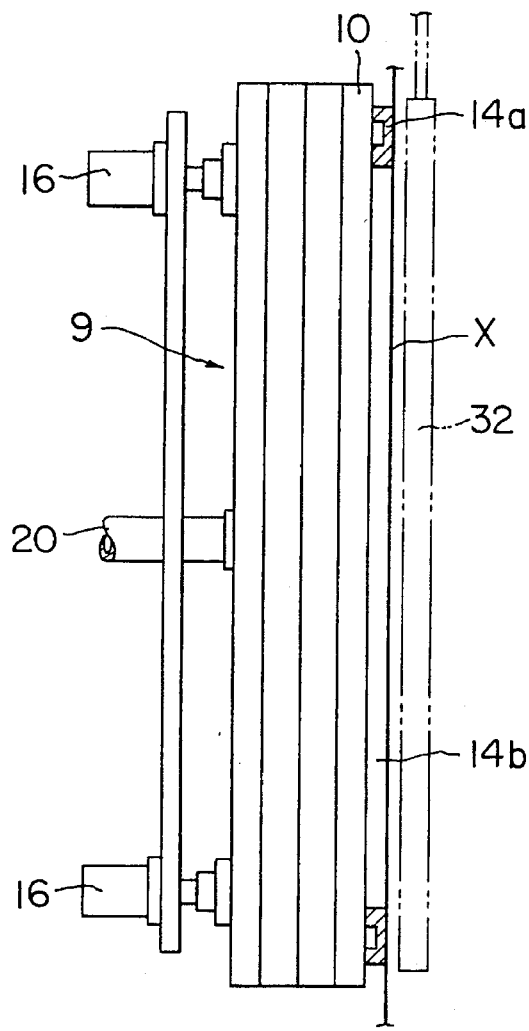
FIG. 5 is a side view showing a pattern-bearing film held by the heating board and the holding means according to the embodiment.

The heating plate 10 of the board 9 is made of a metal with high heat transfer characteristic. In the area where the heating plate 10 is surrounded by a peripheral wall 14a of the holding frame 14, a large number of small air blowing holes 17 are formed in an array at intervals of a predetermined pitch. The air blowing holes 17 pass from the front to rear surfaces of the heating plate 10. With the heating plate 10 and the peripheral wall 14a of the holding frame 14, a recess 14b, which is an essential feature of the present invention, is formed as also shown in FIG. 5. When a ceramic layer is formed on the front surface of the heating plate 10, radiant heat efficiency will be improved. The liner plate 11, which is disposed behind the heating plate 10, is composed of a metal plate with a high heat transfer characteristic. The liner plate 11 has a surface which is in contact with the rear surface of the heating plate 10. The surface has grooves 18 distributed therein through which compressed air is supplied to the air blowing holes 17. An air passageway 19 is provided at the center of the liner plate 11. The air passageway 19 passes through the liner plate 11. The air passageway 19 also passes through the center of the heater panel 12 and the insulation plate 13. The air passageway 19 is open at the rear surface of the insulation plate 13. The open portion of the air passageway 19 is connected to an air hose 20. The air hose 20 can be connected to either a low pressure compressor 22 or a high pressure compressor 23 by a three-way switching valve 21.

The heater panel 12 has a number of heater wires 24. The heater wires 24 are connected to a lead cable (not shown in the figure) which supplies electricity. The insulation plate 13 serves to effectively transfer the heat generated by the heater wires 24 toward the heating plate 10.

Figure 4:
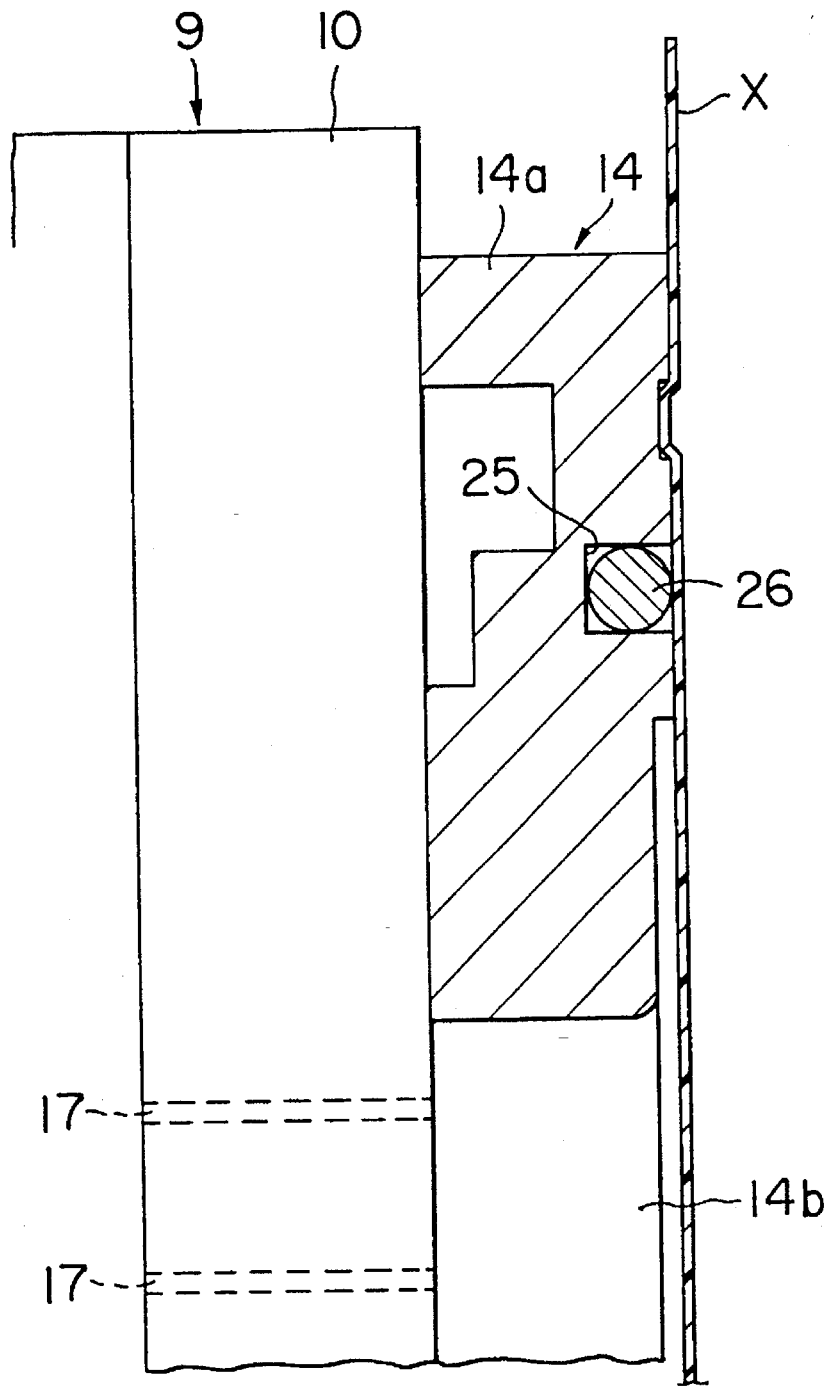
FIG. 4 is an enlarged sectional view showing the heating board and a holding frame.

As shown in FIG. 3 and FIG. 4 (which is an enlarged view of the portion denoted by symbol IV in FIG. 2), a seal ring receiving groove 25 is formed along the peripheral wall 14a of the holding frame 14. A seal ring 26 is fitted in the groove 25. With the seal ring 26, air leakage can be prevented. In addition, in the vacuum molding operation, the pattern-bearing film can be prevented from being deviated from a predetermined position.

Figure 6:
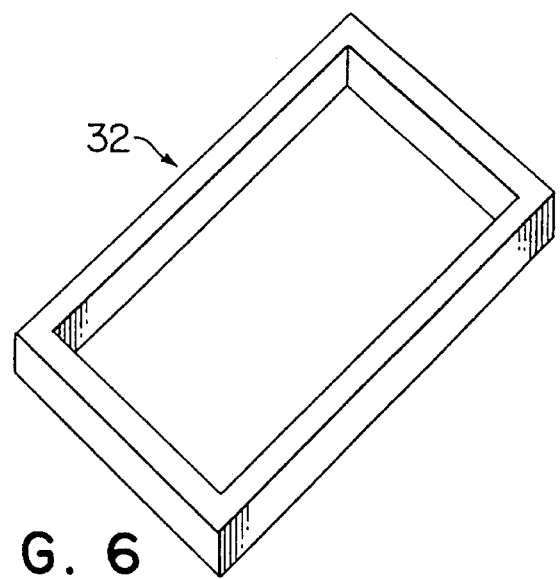
FIG. 6 is a perspective view showing the holding frame according to the embodiment.

As shown in FIGS. 1 and 2, at the standby position of the heating board 9, a film suppressing device 31 is provided in opposition thereto. The film suppressing device 31 includes a square-shaped film suppressing frame 32 (shown in FIG. 6), an air cylinder 33a, and the above-mentioned drive mechanism 33b. The air cylinder 33a operates to move the film suppressing frame 32 along the heating board 9. The drive mechanism 33b operates to move the suppressing frame 32 so that it advances to and retreats from the heating board 9 and the female mold 2. The suppressing frame 32 operates to suppress and hold the pattern-bearing film X in a perfectly non-contact state. The film suppressing device 31 has a chuck device 34 and a cutter device 35. The chuck device 34 pulls the pattern-bearing film X to the position between the heating board 9 and the film suppressing frame 32 while the film suppressing frame 32 is apart from the heating board 9. The cutter device 35 cuts the pulled pattern-bearing film x to have a predetermined size. The cutter device 35 is driven by an air cylinder 36.

The pattern-bearing film X is initially in the form of a strip on which particular patterns Y (see FIG. 3) are printed at predetermined intervals. The pattern-bearing film X is wound in a roll shape and held on a supply and holding device (not shown in the figure). The chuck device 34 catches the end of the pattern-bearing film X and pulls it for a predetermined distance from the film supply and holding device to the front surface of the heating board 9. The length of the pattern-bearing film X to be pulled at a time is equivalent to the length of the pattern supplied on the front surface of the heating board 9 for one shot of the resin molding. A pattern-bearing film section with the pattern Y thereon is pressed toward the heating board 9 by the film suppressing frame 32. While the film is being suppressed and held, the peripheral wall 14a of the holding frame 14 of the heating board 9 supports the peripheral portion of the pattern-bearing film X so as to tension the film to eliminate any wrinkles. In this state, the cutter device 35 cuts the pattern-bearing film X so as to separate the held pattern-bearing film section from the succeeding part of the film X.

Figure 8:
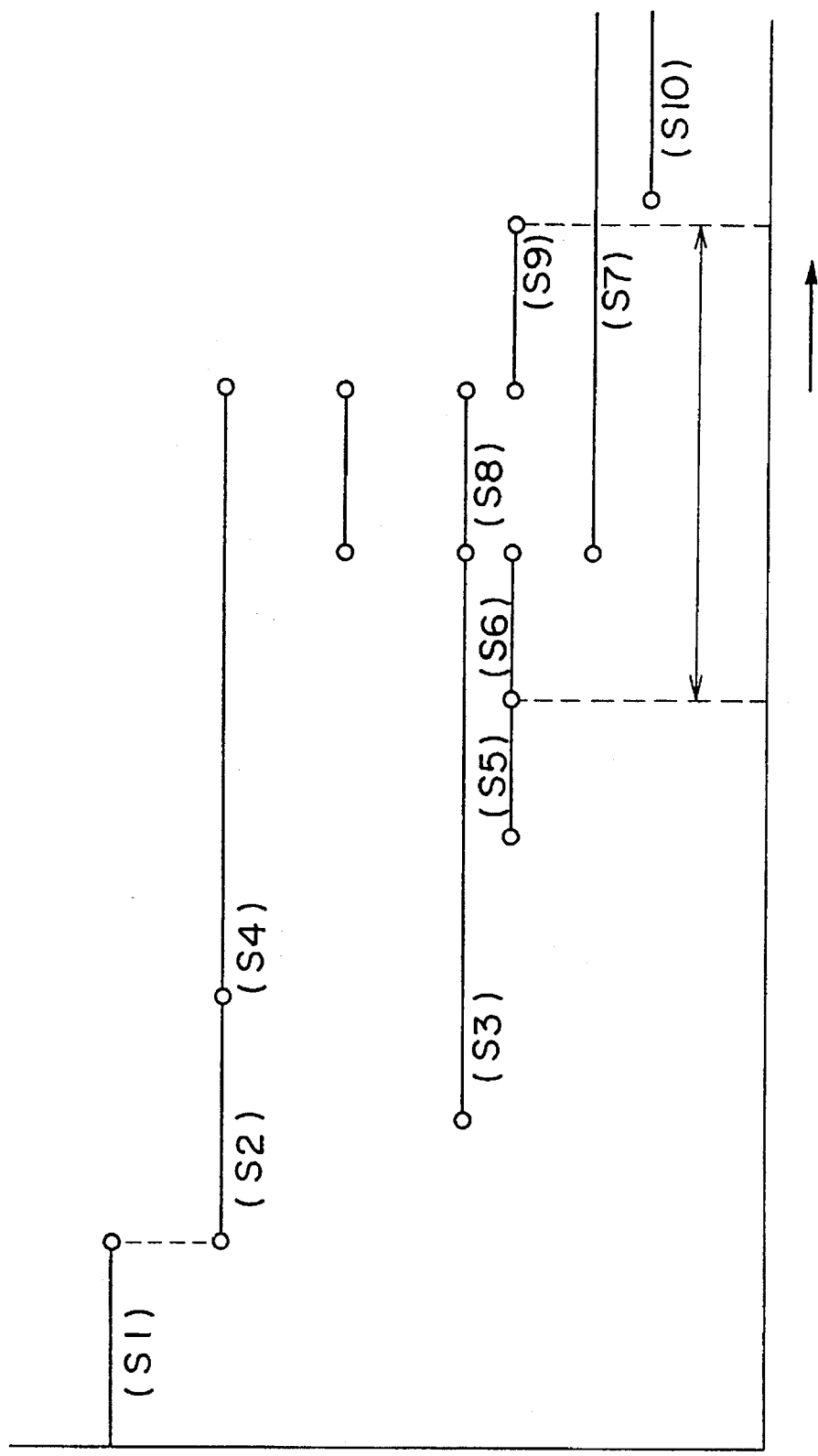
FIG. 8 is a timing chart showing the operation according to the embodiment.
Figure 9:
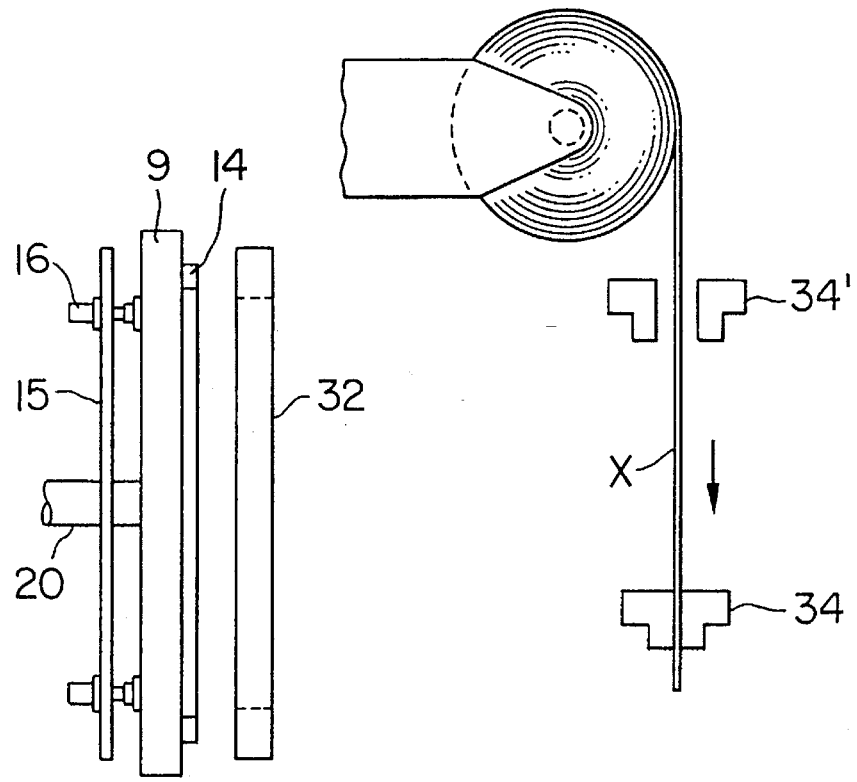
FIGS. 9 through 11 are side views showing successive operational steps of another embodiment of the present invention.
Figure 9:
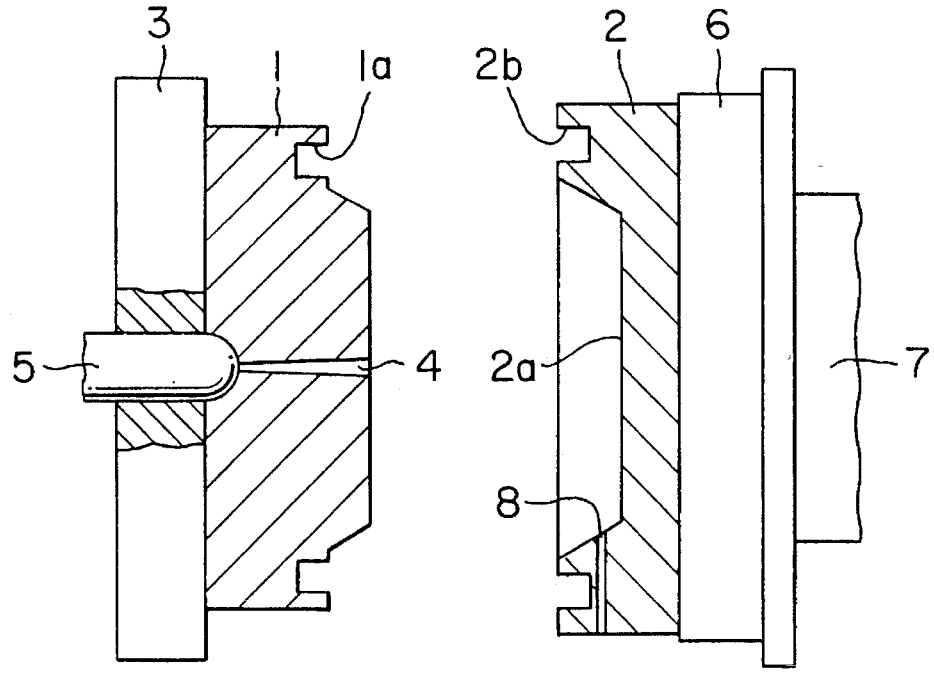

Next, with reference to the timing chart shown in FIG. 8, an example of the operation of the apparatus for forming a pattern onto an article during an injection molding thereof will be described.

When the heating board 9 shown in FIGS. 1 and 2 is placed in the standby position and the film holding frame 32 is apart from the heating board 9, the chuck device 34 pulls the pattern-bearing film X to feed it to the front position of the heating board 9 (step S1). The pulled pattern-bearing film X is pressed to the front surface of the holding frame 14 of the heating board 9 by the film suppressing frame 32 (step S2). Meanwhile, by the three-way switching valve 21, the air passageway 19 and the grooves 18 are connected to the low pressure compressor 22. Air at low pressure supplied from the low pressure compressor 22 is blown in a small quantity out of the air blowing holes 17 in the heating plate 10. Thereafter, the cutter device 35 cuts the film (steps S3 and S4). The blowing amount from the blowing holes 17 should be adjusted so that the pattern-bearing film X is maintained in a spaced parallel relation with the heating board 9 without deviation from the holding frame 14 and without being loosened. When not necessary, the air blowing may be omitted.

Thereafter, the film suppressing frame 32 and the heating board 9 are moved into the space between the male mold 1 and the female mold 2. Thus, the pattern-bearing film X is loaded to the front surface of the female mold 2. Thereafter, while the vacuum pump 30 and the low pressure compressor 22 are connected through the three-way switching valves 21 and 29, respectively, the pattern-bearing film X is maintained parallel to the heating board 9 without looseness while being held on the peripheral wall 14a of the holding frame 14. Thus, the pattern-bearing film X has been loaded while it is spaced apart from the surface of the heating plate 10 in a non-contact state. Since the heating plate 10 is heated by the heater wires 24, the pattern-bearing film X is continually heated and softened by radiant heat from the heating plate 10 and/or by heat transfer through air until the loading of the pattern-bearing film X has been completed. Since the pattern-bearing film X should be softened by heat, it is composed of a thermoplastic resin film. The degree of the softening should be higher than the softening temperature of the thermoplastic resin and less than the melting temperature thereof.

Figure 7:
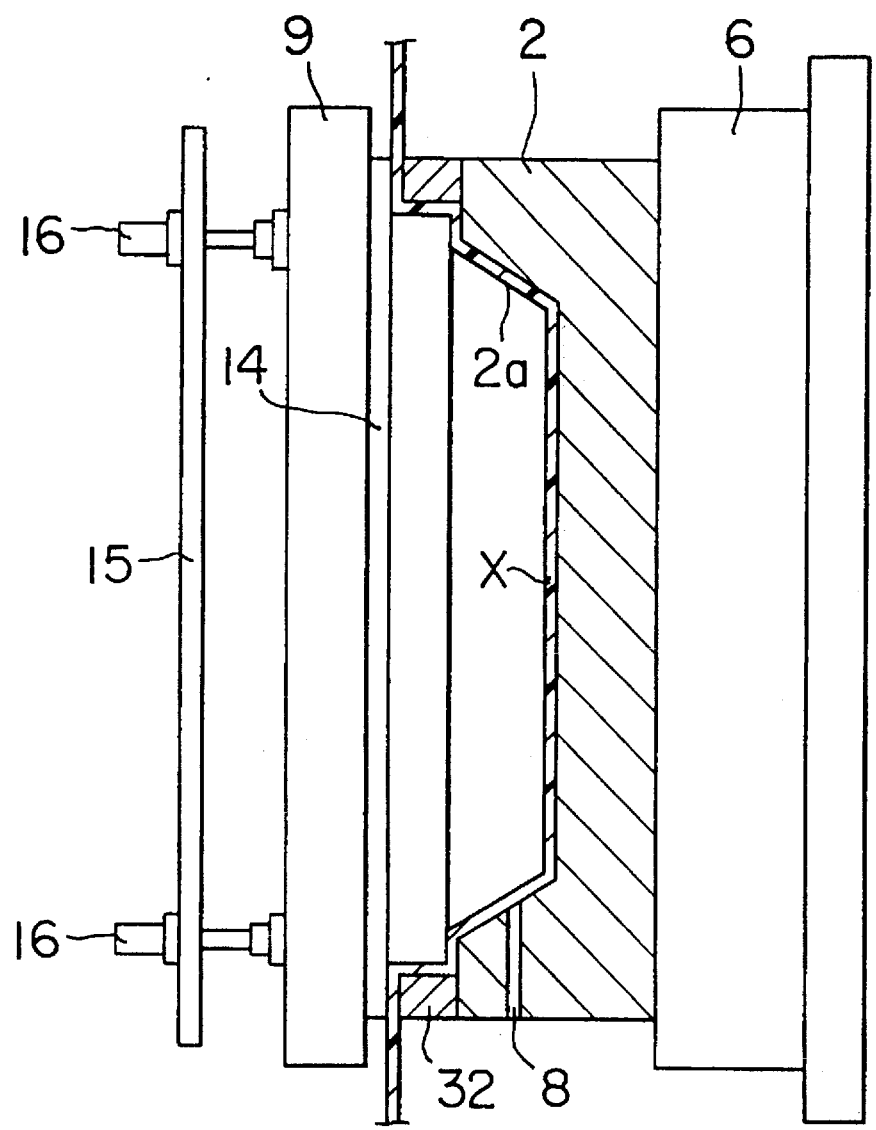
FIG. 7 is a sectional view showing the pattern-bearing film absorbed or sucked by a female mold.

After the pattern-bearing film X is loaded, the solenoids 16 are energized whereupon the heating board 9 is moved toward the female mold 2 (step S5). As shown in FIG. 7, the heating board 9 finally abuts against the female mold 2 (step S6). At this point, air is exhausted from the closed inner space of the female mold 2 through the air exhaust hole 8. Thus, the inside of the female mold 2 becomes vacuum (step S7). Thereafter, by the switching operations of the three-way switching valves 21 and 29, the high pressure compressor 23 is connected to the air passageway 19 in the heating board 9. Thus, compressed air at high pressure is blown out from the air blowing holes 17 (step S8). The air blown and the vacuum inside the female mold 2 cause the pattern-bearing film X to be transferred to the cavity surface 2a of the female mold 2. In other words, the pattern-bearing film X is caused to contact with the mold in the vacuum state. Thereafter, the heating board 9 is retracted from the female mold 2 to the standby position along with the film suppressing frame 32 (step S9). Thus, by the operation of the ram 7, the female mold 2 and the male mold 1 are moved to a closed state. In this mold closing state, a molten resin is supplied into the cavity between the male mold 1 and the female mold 2. Thus, the resin is molded (step S10) and the pattern Y is transferred and printed onto the resin molding.

During the process in which the pattern-bearing film X is loaded between the male mold 1 and the female mold 2 while the film X is being absorbed and heated by the heating board 9, only the peripheral portion of the pattern-bearing film X is pressed to the peripheral wall 14a of the holding frame 14. Thus, the pattern portion Y is in a floating state within the recess 14b defined in the holding frame 14. In addition, since air at low pressure causes the pattern-bearing film X to float from the heating plate 10, marks or impressions of the air blowing holes 17 which are open on the heating plate 10 do not remain on the pattern Y of the pattern-bearing film X. Therefore, uneven marks do not remain on the surface of the resin molding. Furthermore, the gloss of the resin molding does not undergo undesirable variation.

It should be noted that the above-described method is a mere example and that if the pattern-bearing film is heated in a non-contact state while it is held and absorbed to the peripheral wall, any other method may be used.

Next, a method of attaining positional correspondence of the pattern-bearing film and the mold and a method of determining the timing of heating the pattern-bearing film and the timing of feeding the pattern-bearing film to the mold will be described.

Positional correspondence of Pattern-Bearing Film and Mold

When a large number of moldings having the same pattern and the same shape are produced, the pattern-bearing film X is positioned relative to the heating board 9 so that the positions of each pattern Y and the heating board 9 will match at each shot. When the relative positions of the heating board 9 and the female mold 2 which are to be contacted are predetermined, the same relation of positions of the pattern Y and the mold and the same relation of the pattern Y and the molding can be attained at each shot.

As a method for attaining positional correspondence, a known method may be used. For example, when the printing of the pattern of the pattern-bearing film is performed, registration marks (for example, cross-shaped marks) for attaining positional correspondence with respect to the film feeding direction and the width direction are printed at predetermined positions relative to the pattern. In addition, at predetermined positions of the injection molding apparatus, for example at upstream positions of the mold, sensors (for example, photoelectric tubes) which detect the registration marks in both the feed direction and the width direction are provided. Moreover, there are provided drive units (for example, stepping motors) which are controlled in response to detection signals from the sensors.

At step S1, when the feed direction sensor detects the registration mark for the feed direction, the drive unit which drives the chuck device 34 in the feed direction is stopped. Thereafter, the chuck device 34 is driven in the width direction. When the width direction sensor detects the width direction registration mark, the drive unit which drives the chuck device 34 in the width direction is stopped. Thus, the relative position of the pattern to the heating board 9 attains the predetermined position. Thereafter, the operation of the step 2 is performed.

When the relative position of the pattern and the molding need not be equally set at each shot, the above stated positional correspondence system may be omitted.

Timing of Heating of Pattern-Bearing Film and Timing of Feeding Film to Mold

In the above-described embodiment, the pattern-bearing film X which is to be contacted with the heating board 9 is fed to the mold while the pattern-bearing film X is being heated. To shorten the molding cycle, this embodiment is suitable. However, another example where the pattern-bearing film X is heated after it has been fed to the mold may be used.

As an example of the "laminate film" for the above-mentioned pattern-bearing film, a thermoplastic resin such as acrylic resin, acrylonitrile-butadiene-styrene copolymer (ABC), or polyvinyl chloride with a pattern printed may be used.

As an example of the above-mentioned transfer printing film, such a material may be used where a transfer printing layer composed of a transparent protection layer, a pattern layer, and an adhesive layer is formed over a releasable substrate film such as biaxial stretching polyethylene terephthalate resin or polypropylene.

From the viewpoint of the three-dimensional contour-following characteristic (molding characteristic) required in the process for injection-molding articles with simultaneous forming of patterns and from the viewpoint of durability (such as wearing resistance) of the surface of the pattern, a resin which will become a non-tacky thermoplastic solid even in a non-crosslinked state after drying of the diluting solvent may be used. Such resin is disclosed in Japanese Patent Laid-Open Publication Serial Nos. SHO 61-69487 and SHO 60-161121. An example of the film substrate material of the laminate film or the transparent protection layer of the transfer film is a substance where a non-tacky thermoplastic copolymer such as acrylic resin with a glass transition temperature of 0° to 250° C. is added with a polymerizable crosslinkable radical such as acryloyl radical or metaacryloyl radical.

The substance in a state before polymerization or crosslinking is transferred or laminated to the surface of the injected resin molding. Thereafter, with radiation of ultraviolet rays or electric beam, the resultant laminate is crosslinked so that it is hardened.

Next, with reference to FIGS. 9 through 17, another example of positioning, heating, and feeding a pattern-bearing film will be described. In the state shown in FIG. 9, a male mold 1 and a female mold 2 are open. A heating board 9 and a film holding frame 32 are disposed outside the region of the male mold 1 and the female mold 2 (namely, at a standby position). A pattern-bearing film X is wounded on a film supply and holding device so that it can be supplied to a holding frame 14.

Thereafter, a chuck device 34 catches the end of the pattern-bearing film X and pulls it across the male mold 1 and the female mold 2 until it covers the entire cavity of the female mold 2. When necessary, the pattern of the pattern-bearing film X may be adjusted to exactly coincide with the female mold 2 according to the above-mentioned method.

Figure 10:
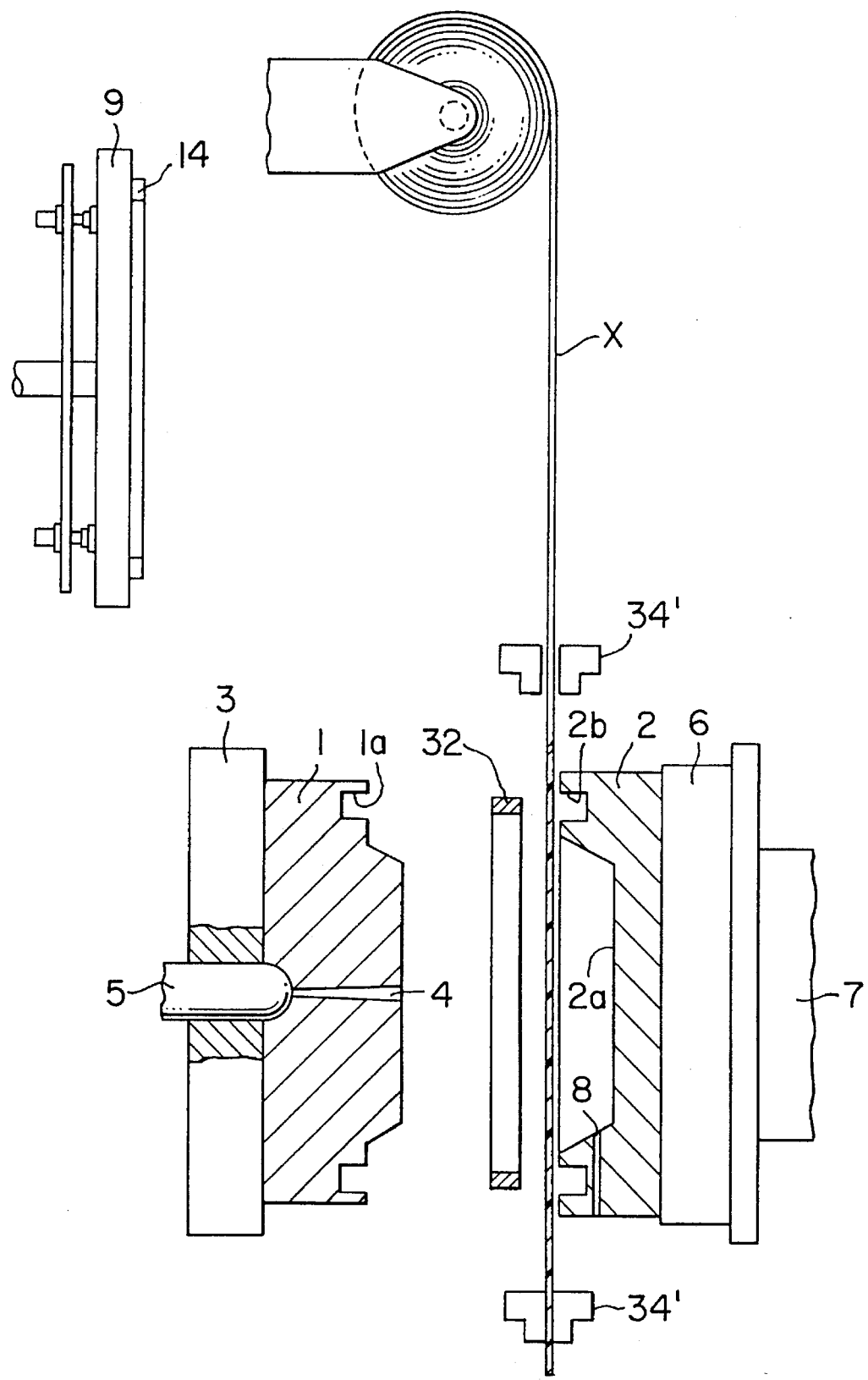

Next, as shown in FIG. 10, the film suppressing frame 32 is moved from the standby position disposed outside the region of the male mold 1 and the female mold 2 to a position opposed to the female mold 2 with the pattern-bearing film X therebetween. Thereafter, the suppressing frame 32 is adjusted to coincide with a film suppressing frame fitting groove 2b on a parting surface of the female 2. The groove 2b is defined so that it surrounds the cavity surface.

Figure 11:
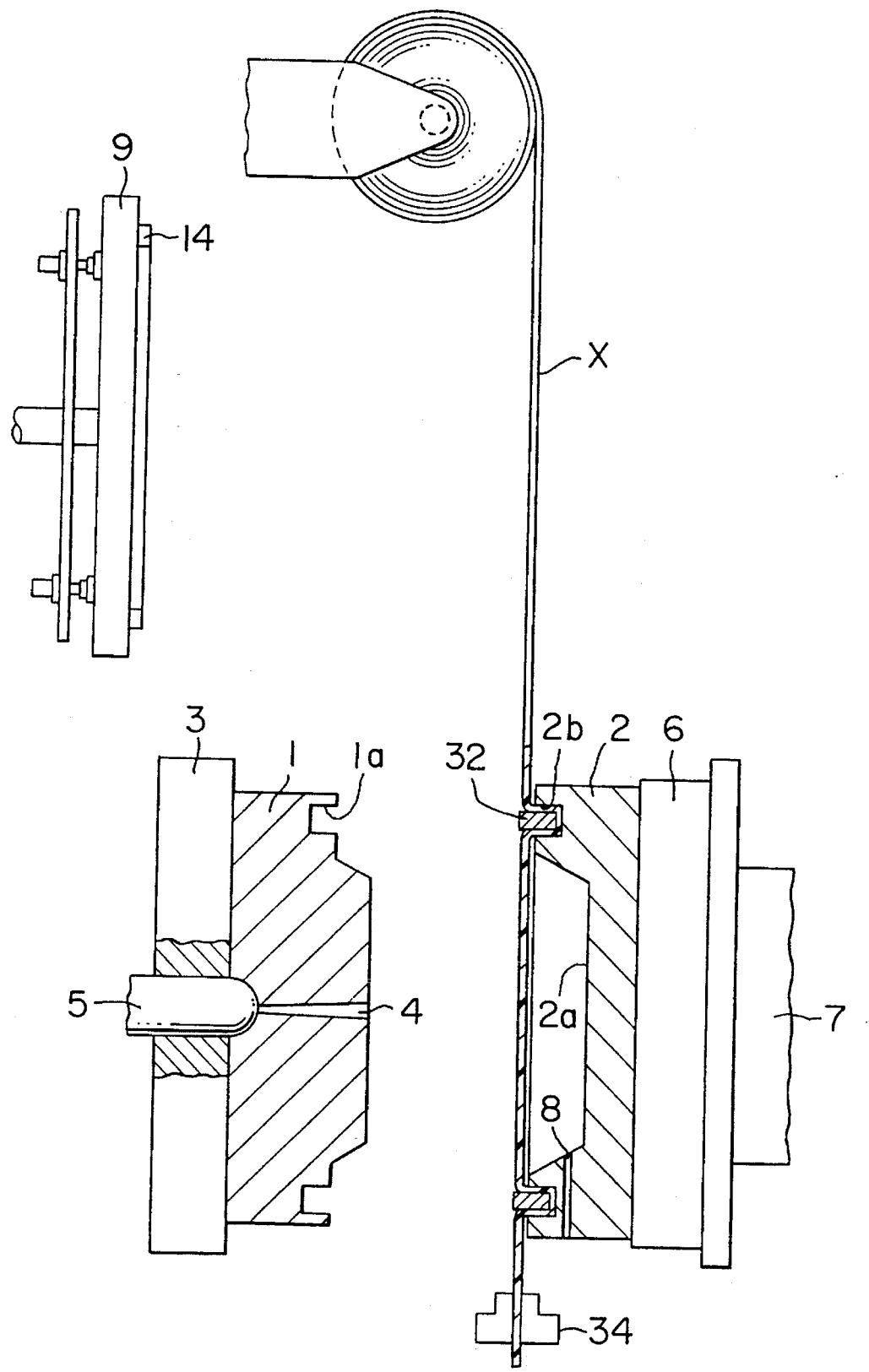

Next, as shown in FIG. 11, the film suppressing frame 32 is pressed into the film suppressing frame fitting groove 2b with the pattern-bearing film X interposed therebetween. Thus, the pattern-bearing film X is contacted to the female mold 2. At this point, it is preferred that the outer surface of the film suppressing frame 32 is level with the parting surface of the female mold 2 after the fitting is completed. However, as shown in the figure, when a film suppressing frame fitting groove 1a is formed on the peripheral portion of the male mold 1 so that it is opposed to the film suppressing frame fitting groove 2b of the female mold 2, it is not necessary to cause the outer surface of the film suppressing frame 32 to be level with the parting surface. Rather, the film suppressing frame 32 may protrude so that a peripheral portion 14a of the holding frame 14 can be easily pressed.

Figure 12:
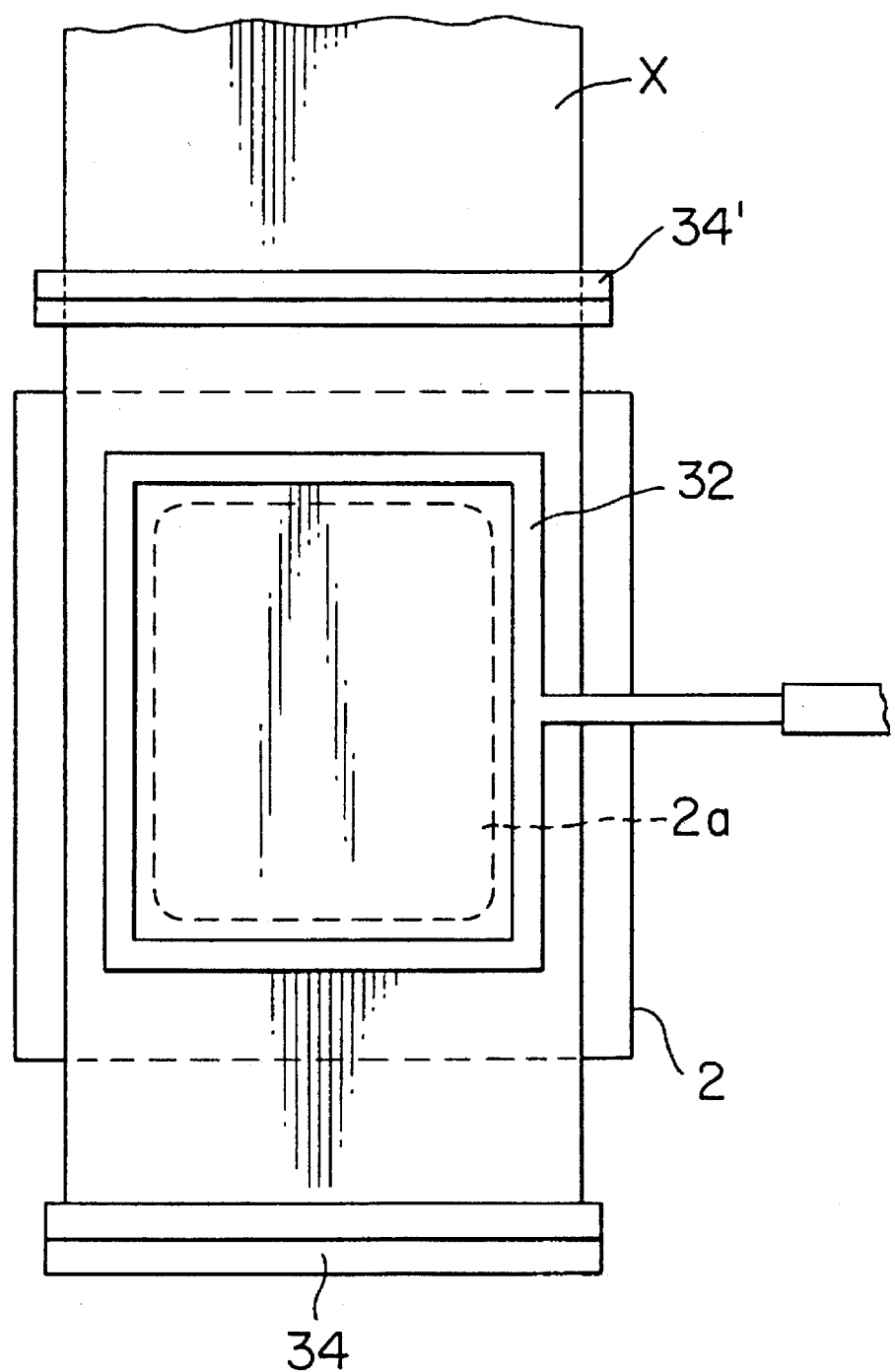
FIG. 12 is a partial left side view, partly in section, of a female mold shown in FIG. 11.

FIG. 12 is a front view of the female mold 2 seen from the left in FIG. 11.

Figure 13:
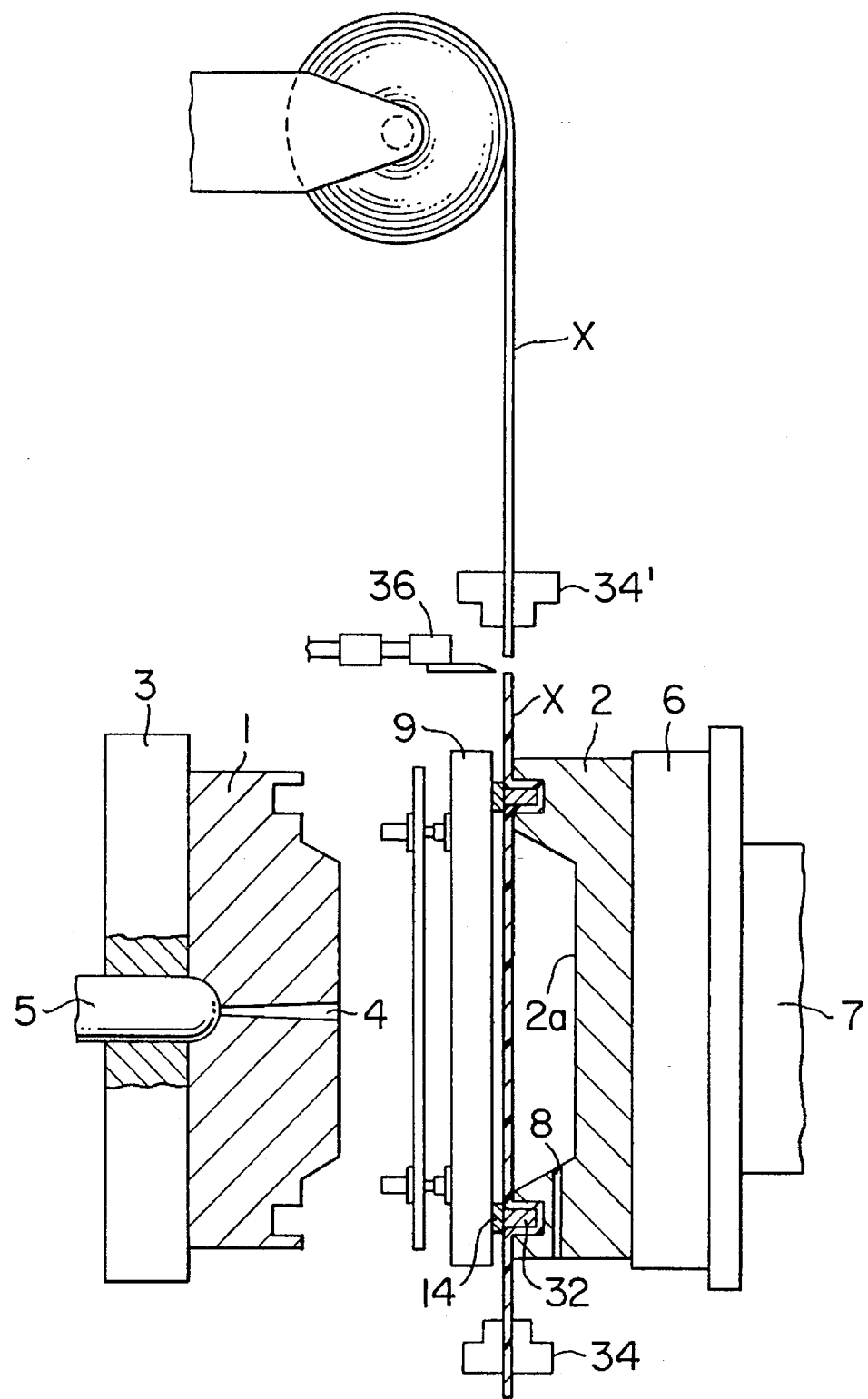
FIGS. 13 through 16 are side views showing further successive operational steps of the other embodiment.

Next, as shown in FIG. 13, the heating board 9 at the standby position is moved to the front surface of the female mold 2. Thereafter, by the peripheral wall 14a of the holding frame 14 on the heating board 9, the pattern-bearing film X is pressed through the film suppressing frame 32. At this stage, the pattern-bearing film X is brought in contact with the peripheral wall of the heating board 9. Thus a closed heating space is formed, and the pattern-bearing film X is heated in a non-contact state.

Figure 14:
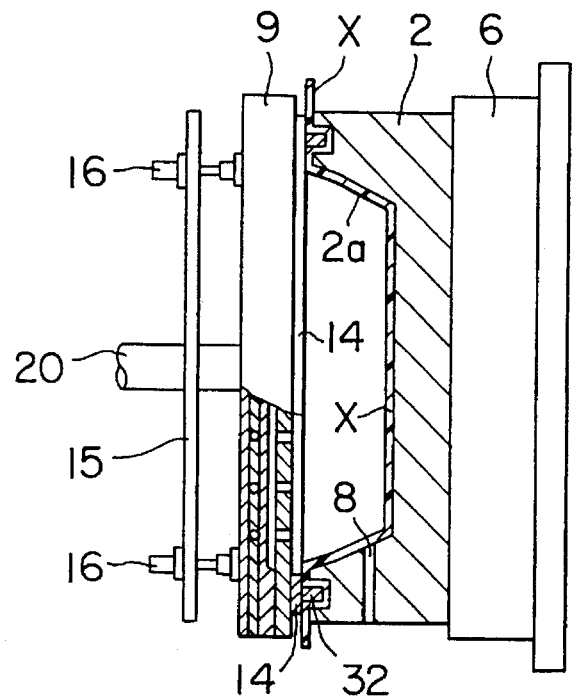

After the pattern-bearing film X is satisfactorily softened, as shown in FIG. 14, it is subjected to a vacuum. Thus, the pattern-bearing film X is caused to accord to the contour of the cavity surface 2a.

Figure 15:
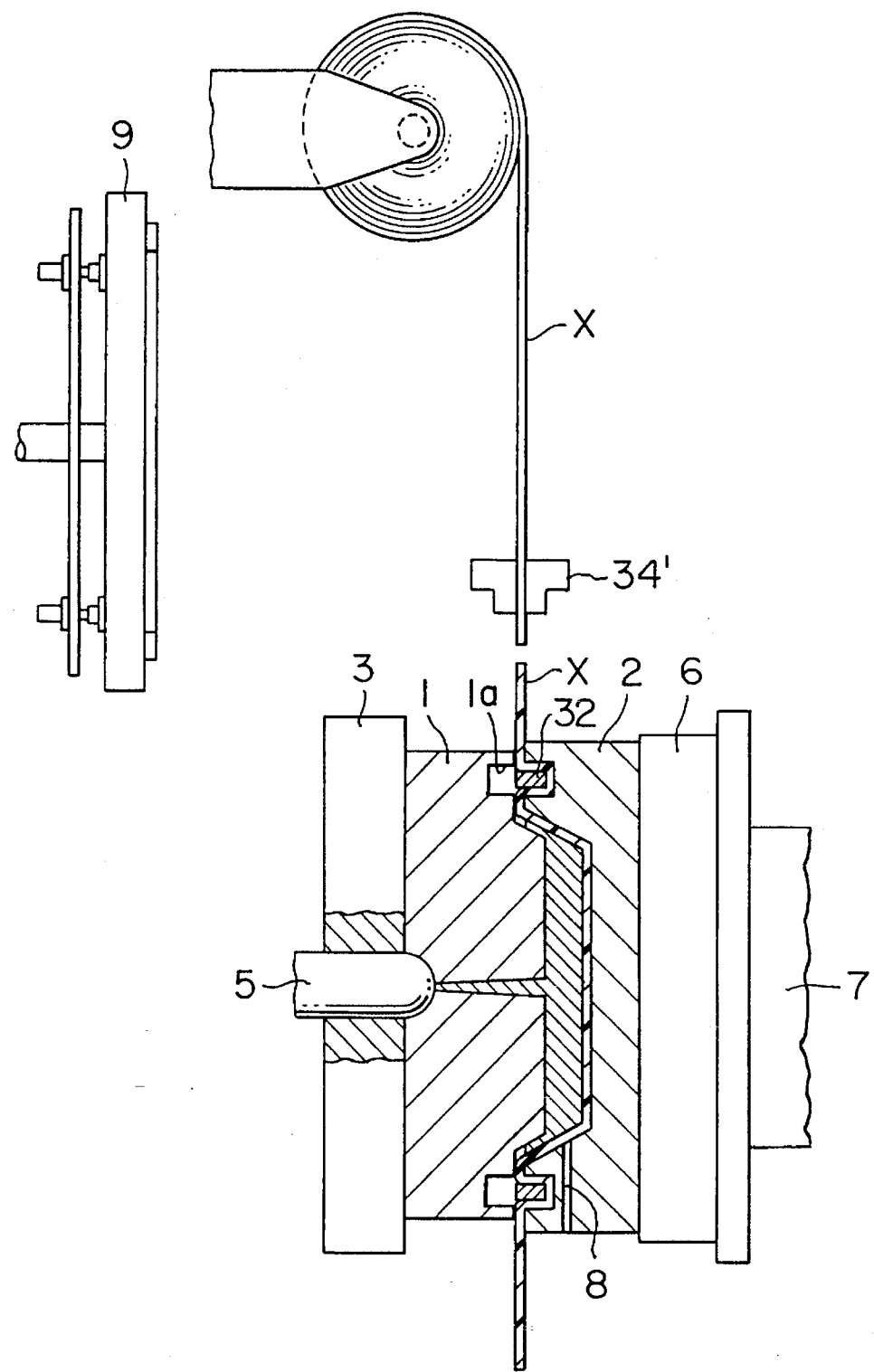

Thereafter, as shown in FIG. 15, the heating board 9 is retreated to the standby position. Next, the female mold 2 and the male mold 2 are clamped. A molten resin is injected from the injection gate 4 so that the cavity is filled therewith.

Figure 16:
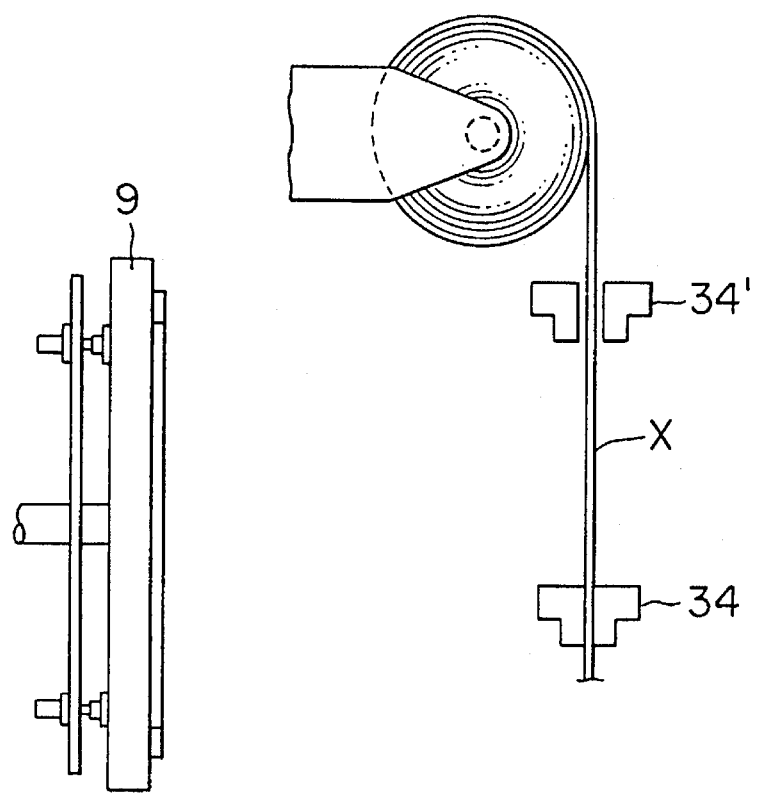
Figure 16:
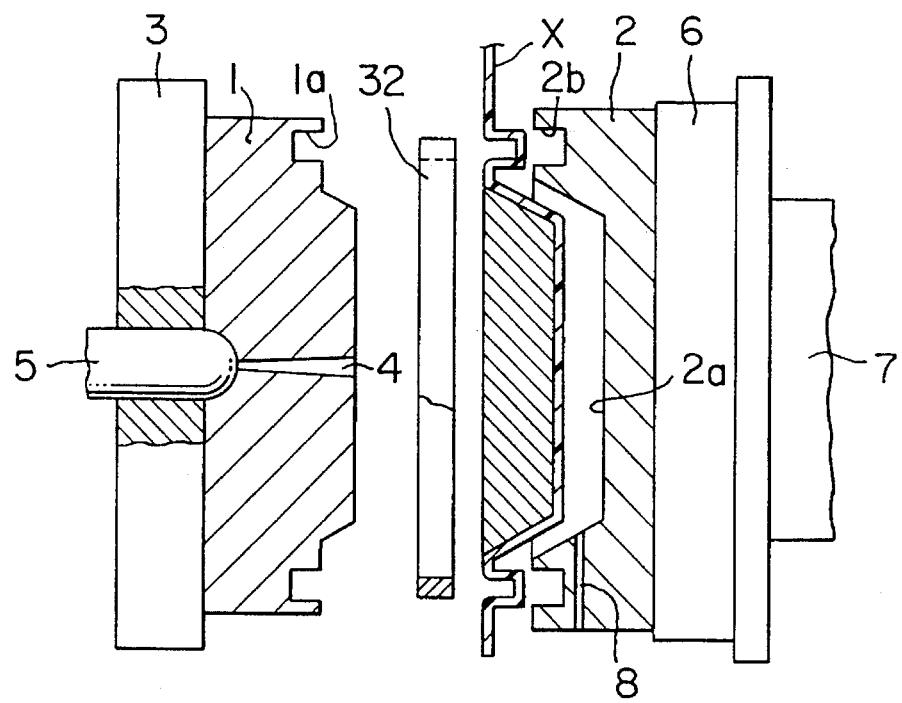

After the molten resin is cooled and solidified, as shown in FIG. 16, the male mold 1 and the female mold 2 are opened and then the film suppressing frame 32 is separated from the film suppressing frame fitting groove 2b on the female mold 2. Thus, a resin molding which is adhered to the pattern-bearing film X is taken out.

When the pattern-bearing film X is a transfer printing film, only the substrate film is peeled off with the pattern being left on the molding.

Figure 17:
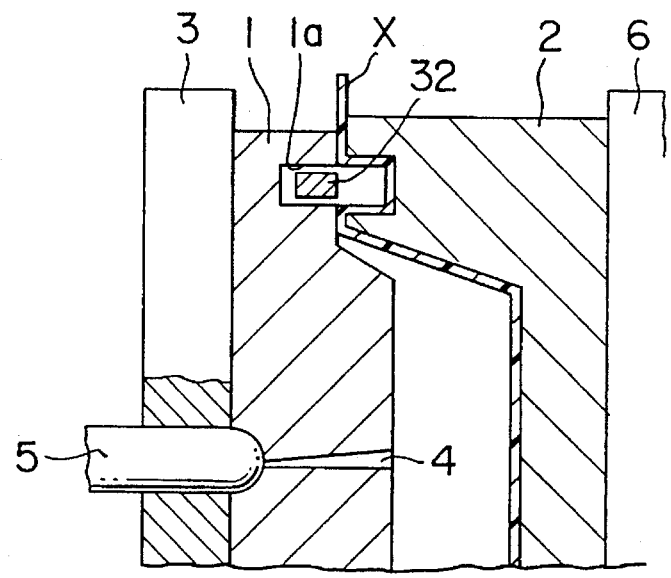
FIG. 17 is an enlarged partial view showing a next step of FIG. 16.

In another example of the method of opening the mold, when the molten resin has been cooled and solidified, as shown in FIG. 17, the film suppressing frame 32 is moved from within the fitting groove 2b of the female mold 2 into the fitting groove of the male mold 1. After the pattern-bearing film X is released, the mold opening operation shown in FIG. 16 may be performed. In this method, the molding may be more easily taken out from the male mold 1 and the female mold 2.

An effect intrinsic to the above-described embodiment is that since the pattern-bearing film X is fixed directly on the parting surface of the female mold and is thereafter heated and softened, deformation and displacement seldom take place on the pattern-bearing film X. In particular, when a pattern is to positionally coincide with the mold, a high positional accuracy is readily obtained.

In the above-mentioned embodiments, the transfer printing method was described. However, it should be noted that the present invention may be applied to the laminate method.

In addition, in the embodiments, the panel heater which radiates near-infrared rays was used. Besides such a heater, an electric heater (which uses Nichrome coils and directly radiates Joule's heat of surface resistor or the like to the pattern-bearing film), a ceramic panel heater (which radiates far-infrared rays), or dielectric heating may be used. Moreover, as an example of heat transfer to the pattern-bearing film, radiant of infrared rays, electromagnetic wave, or the like may be directly used. Furthermore, air in the closed space may be heated so as to use heat transfer thereof to the pattern-bearing film X. Of course, both methods may be used.

As described above, according to the present invention, since the pattern-bearing film is preheated in a non-contact state, the heating board and the pattern-bearing film are not caused to contact. Thus, marks or impressions of through-holes of the heating board do not remain on the pattern-bearing film. As a result, these marks or impressions do not remain on the moldings.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A method for forming a pattern onto an article during an injection molding thereof, comprising the steps of:

moving a pattern-bearing film to a molding position where a male mold and a female mold are opposed;

moving a heating board to said molding position;

holding only an outer peripheral portion of said pattern-bearing film in a set-apart but sealed relation to a heating surface of said heating board to form a closed space between said heating surface and said pattern-bearing film;

supplying air to said space to maintain the pattern-bearing film in a spaced parallel relation with said heating board;

heating and softening said pattern-bearing film by the heating board while said spaced parallel relation is being maintained;

transferring said heated pattern-bearing film onto an internal surface of said female mold to contact said pattern-bearing film with said internal surface;

then retracting said heating board from said molding position;

clamping said male mold and said female mold while said heated pattern-bearing film is in contact with said internal surface; and injecting a molten resin into a cavity defined by said male mold and said female mold to form a molded article and to adhere said pattern-bearing film to a surface of said article.

2. The method as set forth in claim 1, further comprising the step of:

supplying air at high pressure to said closed space to transfer said pattern-bearing film to the internal surface of said female mold.

3. The method as set forth in claim 1, further comprising the step of:

supplying air to said closed space through a large number of air blowing holes provided in said heating surface.

4. The method as set forth in claim 1, wherein said holding step is performed between a holding frame fixed on said heating surface of the heating board and a film suppressing frame for holding said pattern-bearing film.

5. The method as set forth in claim 1, further comprising the steps of:

feeding said pattern-bearing film onto a parting surface of said female mold;

holding said pattern-bearing film over said parting surface; and heating said pattern-bearing film held over said parting surface of said female mold, wherein said heating step is performed by said heating surface of said heating board.

6. A method for forming a pattern onto an article during an injection molding thereof, comprising the steps of:

moving a pattern-bearing film to a molding position where a male mold and a female mold are opposed;

holding only an outer peripheral portion of said pattern-bearing film on a parting surface of said female mold by fitting a film suppressing frame into a groove provided in said parting surface with said pattern-bearing film held therebetween;

moving a heating board to said molding position with a heating surface of the heating board spaced from the pattern-bearing film;

heating and softening said pattern-bearing film by the heating board;

transferring said heated pattern-bearing film onto an internal surface of said female mold to contact said pattern-bearing film with said internal surface;

then retracting said heating board from said molding position;

clamping said male mold and said female mold while said heated pattern-bearing film is in contact with said internal surface; and injecting a molten resin into a cavity defined by said male mold and said female mold to form a molded article and to adhere said pattern-bearing film to a surface of said article.

7. A method for forming a pattern onto an article during an injection molding thereof, comprising the steps of:

moving a pattern-bearing film to a molding position where a male mold and a female mold are opposed;

moving a heating board to said molding position;

holding only an outer periphery of said pattern-bearing film in a set-apart but sealed relation to a heating surface of a heating board with said heating surface spaced from the pattern-bearing films supplying air into a space between said heating surface and said pattern-bearing film to maintain the pattern-bearing film in a spaced parallel relation with said heating board;

thereafter heating and softening said pattern-bearing film by the heating board;

transferring said heated pattern-bearing film onto an internal surface of said female mold to contact said pattern-bearing film with said internal surface;

then retracting said heating board from said molding position;

clamping said male mold and said female mold while said heated pattern-bearing film is in contact with said internal surface; and injecting a molten resin into a cavity defined by said male mold and said female mold to form a molded article and to adhere said pattern-bearing film to a surface of said article.

8. The method as set forth in claim 7, further comprising the step of:

holding said outer peripheral portion of said pattern-bearing film so that a closed heating space will be formed between said pattern-bearing film and said heating surface of said heating board.

9. The method as set forth in claim 8, further comprising the step of:

supplying air at high pressure to said closed heating space to transfer said pattern-bearing film to the internal surface of said female mold.

10. The method as set forth in claim 7, further comprising the step of:

supplying air to said space through a large number of air blowing holes provided in said heating surface.

11. The method as set forth in claim 7, wherein said holding step is performed between a holding frame fixed on said heating surface of the heating board and a film suppressing frame for holding said pattern-bearing film.

12. The method as set forth in claim 7, further comprising the steps of:

feeding said pattern-bearing film onto a parting surface of said female mold;

holding said pattern-bearing film over said parting surface; and heating said pattern-bearing film held over said parting surface of said female mold, wherein said heating step is performed by said heating surface of said heating board.

* * * * *